United States Patent [19]

Belder et al.

[11] Patent Number: 4,528,341

[45] Date of Patent: Jul. 9, 1985

[54] POLYESTER AND ITS USE IN POWDER COATING

[75] Inventors: Eimbert G. Belder; Robert van der Linde; Jan Schippers, all of Zwolle, Netherlands

[73] Assignee: DSM Resins B.V., Zwolle, Netherlands

[21] Appl. No.: 638,429

[22] Filed: Aug. 8, 1984

Related U.S. Application Data

[62] Division of Ser. No. 478,546, Mar. 24, 1983, Pat. No. 4,471,108.

[30] Foreign Application Priority Data

Oct. 29, 1982 [NL] Netherlands ................... 8204205

[51] Int. Cl.$^3$ ............... C08F 283/00; C08F 283/02; C08G 63/76
[52] U.S. Cl. ..................................... 525/438; 525/440
[58] Field of Search ............................. 525/438, 440

[56] References Cited

U.S. PATENT DOCUMENTS

| | | | |
|---|---|---|---|
| 3,988,288 | 10/1976 | Yamauchi et al. | 525/438 X |
| 4,085,159 | 4/1978 | Marsiat | 525/438 |
| 4,087,479 | 5/1978 | Toyota et al. | 525/438 |
| 4,147,737 | 4/1979 | Sein et al. | 525/438 |
| 4,288,569 | 9/1981 | Rottmaier et al. | 525/438 X |

*Primary Examiner*—Lucille M. Phynes
*Attorney, Agent, or Firm*—Cushman, Darby & Cushman

[57] ABSTRACT

An improved carboxyl-group-containing polyester resin composition as described of an aromatic carboxylic acid and an aliphatic diol having the following combination of properties: (a) an acid number between 10 and 26 mg KOH/g, (b) a hydroxyl number that is smaller than 15 mg KOH/g, (c) a theoretical number-average molecular weight between 4,500 and 12,500 and (d) a glass transistion temperature between 40° and 85° C.

17 Claims, No Drawings

POLYESTER AND ITS USE IN POWDER COATING

This is a division of application Ser. No. 478,546, filed Mar. 24, 1983, now U.S. Pat. No. 4,471,108, granted Sept. 11, 1984.

This application relates to a novel carboxyl group containing polyester which polyester is substantially based on an aromatic dicarboxylic acid mixture and on a substantially aliphatic diol mixture and which is used with a tri-epoxy compound as binding agent in powder coating. In particular, triglycidyl isocyanurate is advantageously used together with the polyester resin in powder coatings.

Polyesters containing carboxyl groups for powder coatings are already known in the prior art, and in practice these polyesters are processed to form binding agents for powder coating in a combination with at least 7% triglycidyl isocyanurate (TGIC) and consequently at most 93% polyester. Compare Dutch Patent Specification No. 159,129, as well as Dutch Published Application No. 7604421.

In use, these known binding agents for powder coating present one or several of the following problems:
1. The relatively high content of TGIC requires a polyester having a relatively high glass transition temperature, as a result of which limitations in the freedom of formulation of the polyester occur.
2. The flow of the polyester-epoxy combination is not optimal ("orange-peel effect").
3. The physical and sometimes also the chemical powder stability is not all that is to be desired, particularly with polyesters having a glass transition temperature below 55° C.
4. The cured coating layer is sometimes not completely water-clear.

It is an object of this invention to provide a novel improved carboxyl group containing polyester resin composition which has advantageous characteristics in overcoming the aforesaid problems; and further to provide novel coating compositions composed of such resins in combination with tri-epoxy compounds.

The present invention now provides polyesters and binding agents for powder coatings which are improved with respect to one or several of the aforementioned problems. The polyesters according to the invention exhibit a combination of characteristics, namely an acid number of 10-26 mg KOH/g, a hydroxyl number of at most 15, advantageously a maximum of 5 mg KOH/g, a theoretical number-average molecular weight (calculated according to Patton) of 4,500–12,000 and a glass transition temperature between 40° and 85° C.

Especially conspicuous in such polyesters is especially the relatively high molecular weight; and, it is quite surprising that in spite of this high molecular weight an excellent flow of the powder coating is obtained. Moreover, because of the relatively high molecular weight, the polyester resin contains relatively little low molecular material, as a result of which a better powder stability arises. The low lower limit of the glass transition temperature range is also conspicuous. The greater clearness in combination with the excellent flow exhibited by the coatings using the binding agents employing the polyester resin made according to this invention makes these polester/epoxy systems particularly suitable as a top-coat for automobiles.

Preferably the acid number of this polyester (resin) is between 12 and 24 mg KOH/g. The theoretical number-average molecular weight of the polyester is preferably 5,500–10,000, while the glass transition temperature is preferably between 50° and 70° C. The average carboxyl functionality of the polyester is situated in the range of 2 to 3, preferably between 2.2 and 2.8, more particularly between 2.2 and 2.5.

The polyesters containing carboxyl groups, which are provided according to the invention, may be prepared, by methods which are already known per se, from substantially aromatic polycarboxylic acids, such as phthalic acid, isophthalic acid, terephthalic acid, benzene-1,2,4-tricarboxylic acid, pyromellitic acid, trimesic acid, 3,6-dichlorophthalic acid, tetrachlorophthalic acid, as well as, insofar as they are obtainable, from the corresponding anhydrides, acid chlorides or lower alkyl esters thereof.

Preferably the carboxylic acid component consists of at least 50%, preferably at least 70 mol. % of aromatic dicarboxylic acids, particularly isophthalic acid and/or terephthalic acid.

Further, lower aliphatic diols may especially be used for the polyester formation, such as ethylene glycol, propane-1,2-diol, propane-1,3-diol, butane-1,2-diol, butane-1,4-diol, butane-1,3-diol, 2,2-dimethylpropanediol-1,3 (i.e., neopentyl glycol), hexane-2,5-diol, hexane-1,6-diol, 2,2-[bis-(4-hydroxycyclohexyl)]-propane, 1,4-dimethylolcyclohexane, diethylene glycol, dipropylene glycol and 2,2-bis-[4-(2-hydroxyethoxy)]-phenylpropane and smaller amounts of polyols, such as glycerol, hexanetriol, pentaerythritol, sorbitol, trimethylolethane, trimethylolpropane and tris-(2-hydroxyethyl)-isocyanurate. Instead of diols and polyols, epoxy compounds may also be used.

Preferably the alcohol component contains at least 50 mol. % neopentyl glycol and/or propylene glycol.

In addition, cycloaliphatic and/or acyclic polycarboxylic acids may be used as the polycarboxylic acids, such as, for example, tetrahydrophthalic acid, hexahydroendomethylenetetrahydrophthalic acid, azelaic acid, sebacic acid, decanedicarboxylic acid, dimeric fatty acid, adipic acid, succinic acid and maleic acid. Such acids are used in amounts up to at most 30 mol. %, preferably to a maximum of 20 mol. % of the total amount of carboxylic acids. Similarly, hydroxycarboxylic acids and/or alternatively lactones may be used, e.g., 12-hydroxystearic acid, epsiloncaprolactone, hydroxypivalic acid ester of neopentyl glycol (esterdiol 204). Monocarboxylic acids, such as benzoic acid, tert.-butylbenzoic acid, hexahydrobenzoic acid and saturated aliphatic monocarboxylic acids may also be added in minor amounts during the preparation.

The polyesters are prepared by methods already known per se, e.g., by esterification or interesterification, possibly in the presence of usual catalysts such as e.g., dibutyl-tin oxide or tetrabutyl titanate, whereby, through a suitable choice of the reaction conditions of the COOH/OH ratio, end products are obtained for which the acid number lies between 10 and 25, preferably between 12 and 23.

After synthesis, the polyesters are preferably practically free from hydroxyl groups, i.e., the hydroxyl number is less than 15, preferably less than 5 mg KOH/g. For optimal adjustment of the glass transition temperature, and the viscosity, it is also advantageous to use up to 15 mol. % of a compound having 4 or more methylene groups optionally substituted with lower alkyl groups (methyl or ethyl). For example, adipic acid, hexanediol-1,6 or dipropylene glycol may be used as such.

As cross-linking agent preferably triglycidyl isocyanurate or a related heterocyclic tri-epoxy compound is used. As such, methyl-substituted triglycidyl isocyanurate or 1,2,4-triglycidyl-triazolidin-3,4-dione may be used. Preferably used is TGIC having an epoxy content of at least 9.3 equivalent per kg.

The amount of tri-epoxy compound that is used in combination with the polyester containing carboxyl groups according to the invention, to form the novel coating compositions, is dependent on the acid number of the polyester and lies between 0.8 and 1.2, preferably between 0.9 and 1.1 equivalent epoxy per equivalent carboxyl. In the case of triglycidyl isocyanurate this means that between 1.4 and 5.3, preferably between 1.6 and 4.9 wt. % TGIC and consequently 94.7 to 98.6, preferably 95.1 to 98.4 wt. % polyester are used. It is quite surprising that, with the use of these small amounts of TGIC, nevertheless well-cured coating layers are obtained.

To make the coating compositions, the polyester and the tri-epoxy compound are homogeneously mixed, preferably in the melt, and preferably by means of an extruder mechanism. As a rule, the usual additives are introduced before the mixing. This especially applies to additives such as flowing aids, curing catalysts and optionally pigments and/or fillers. The mixture thus obtained is subsequently ground and sieved, and is then applied with the aid of an electrostatic spraying apparatus and thereafter cured in a stoving oven at temperatures between 160° and 200° C. for 10 to 30 minutes. The coating layer thus obtained exhibits an excellent combination of gloss, flow, clearness and mechanical properties, while the powder coating has very good powder stability both in chemical and physical respect.

The invention will be further illustrated by the following non-limiting examples:

EXAMPLE 1A

A. Preparation of the polyester resin

A three liter reaction vessel, equipped with a thermometer, a stirrer and a distillation apparatus, was filled with the following materials: 17 g trimethylolpropane, 1,475 g terephthalic acid, 1,055 g neopentyl glycol, 58 g 1,4-cyclohexanedimethylol, 71 g hexanediol-1,6 and 29 g adipic acid.

Thereafter, with stirring, while a light stream of nitrogen was led over the reaction mixture, the temperature was increased to 200° C., whereat water formed. The temperature was gradually increased further to a maximum of 250° C. and the water was distilled off. After 453 ml water had been collected the acid number of the ester was 13.7 mg KOH/g.

Subsequently, 355 g isophthalic acid was added and further esterified to an acid number of 19.8 mg KOH/g. The last part of this process was carried out under reduced pressure.

The theoretical number-average molecular weight (Mn) of the acidic polyester obtained was 6,500, the glass transition temperature was 58° C., the hydroxyl number was less than 5 mg KOH/g and the viscosity was 700 dPa.s at 165° C. (measured with an Emila rotation viscosimeter).

EXAMPLES 2A–10A

Following the procedure described in Example 1A, polyester resins according to the invention were prepared of which the charge composition, acid number, OH number, viscosity at 165° C., glass transition temperature and theoretical number-average molecular weight are given in following Table 1.

EXAMPLE 1B

B. Preparation of the powder coating 576 g of the granulated polyester resin of Example 1A was dry-mixed with 24 g triglycidyl isocyanurate, 300 g titanium dioxide (from Kronos TM, CL 310), 9 g Resiflow TM PV-5 (a polyacrylate 66% active, remainder probably silica—from Worlee TM) and 4.5 g benzoin, and subsequently introduced into an extruder (Buss TM made, type PR 46). The extrudate was cooled, ground and sieved, the sieve fraction, smaller than 90 micrometer, being collected and used as the powder coating. This powder coating was electrostatically sprayed onto steel panels which had been degreased beforehand with trichloroethane. For this, a Gema TM made, type HP 720, electrostatic spraying apparatus was employed. Thereafter the panels were evaluated on the following properties:

Glass (Gardner 60°): 92
Mechanical properties:
(Reverse Impact): greater than 11 kg/cm$^2$ (i.e., greater than 160 psi)
Flow of the coating layer visual: 10
Powder stability (28 days at 40° C.): good.

EXAMPLES 2B–10B

In the same manner as in Example 1B, powder coatings were prepared starting from the polyester resins according to Examples 2A–10A. The compositions and the test results of these powder coatings are given in following Table 2.

EXAMPLE 11B

Starting from the polyester resin 7A, a clear (non-pigmented) powder coating was prepared following the same procedure as described in Example 1B, with the exception of the fact that 4.8 g silicon surfactant SR 232 (from British Petroleum) was used as the flowing aid instead of Resiflow TM PV-5. The panels sprayed therewith exhibited properties similar to those of Example 7B, while the coating layer had excellent clearness.

TABLE 1

| | Composition and properties of the exemplified polyesters | | | | | | | | |
|---|---|---|---|---|---|---|---|---|---|
| | 2A | 3A | 4A | 5A | 6A | 7A | 8A | 9A | 10A |
| Composition (g.) | | | | | | | | | |
| terephthalic acid | 1669 | 1727 | 1499 | 1709 | 1530 | 1518 | 1550 | 1445 | 1605 |
| neopentyl glycol | 1030 | 1004 | 1040 | 1065 | 1029 | 1002 | 1017 | 1013 | 1079 |
| adipic acid | | | | | | | | 29 | 83 |
| hexanediol-1,6 | 71 | | | | 110 | 121 | | 93 | 84 |
| pentanediol-1,5 | | | 63 | 84 | | | | | |
| diethylene glycol | | | | | | | 110 | | |
| isophthalic acid | 155 | 154 | 372 | 171 | 325 | 341 | 314 | 348 | 113 |

TABLE 1-continued

| Composition and properties of the exemplified polyesters | | | | | | | | | |
|---|---|---|---|---|---|---|---|---|---|
| | 2A | 3A | 4A | 5A | 6A | 7A | 8A | 9A | 10A |
| 1,4-cyclohexanedimethylol | 58 | | 58 | | 54 | 54 | 50 | 57 | |
| ethylene glycol | | 99 | | | | | | | |
| trimethylolpropane | 17 | 17 | 30 | 30 | 12 | 25 | 19 | 17 | 16 |
| 12-hydroxystearic acid | 60 | 59 | | | | | | | 21 |
| Properties | | | | | | | | | |
| acid no. (mg KOH/g) | 19.8 | 18.0 | 20.2 | 20.5 | 16.4 | 20.8 | 19.8 | 19.6 | 16.5 |
| Mn | 6500 | 6500 | 6500 | 6500 | 7000 | 7000 | 7500 | 6500 | 9000 |
| Hydroxyl no. (mg KOH/g) | <5 | <5 | <5 | <5 | <5 | <5 | <5 | <5 | <5 |
| Viscosity at 165° C. (dPa.s) | 430 | 720 | 1100 | 1300 | 650 | 1100 | 970 | 610 | 510 |
| Glass transition temp (°C.) | 52 | 56.5 | 57.5 | 58 | 59.5 | 58.5 | 56 | 54 | 48.5 |
| Average carboxyl functionality | 2.3 | 2.3 | 2.5 | 2.5 | 2.2 | 2.5 | 2.4 | 2.3 | 2.4 |

TABLE 2

| Composition and properties of the exemplified powder coatings | | | | | | | | | |
|---|---|---|---|---|---|---|---|---|---|
| | 2B | 3B | 4B | 5B | 6B | 7B | 8B | 9B | 10B |
| Composition (g.) | | | | | | | | | |
| Polyester resin | 576 | 576 | 576 | 576 | 582 | 576 | 576 | 576 | 583 |
| TGIC* | 24 | 24 | 24 | 24 | 18 | 24 | 24 | 24 | 17 |
| Pigment (TiO$_2$) | 300 | 300 | 300 | 300 | 300 | 300 | 300 | 300 | 300 |
| Resiflow PV-5 | 9 | 9 | 9 | 9 | 9 | 9 | 9 | 9 | 9 |
| Benzoin | 4.5 | 4.5 | 4.5 | 4.5 | 4.5 | 4.5 | 4.5 | 4.5 | 4.5 |
| Properties | | | | | | | | | |
| Gloss (Gardner 60°) | 92 | 90 | 91 | 93 | 90 | 95 | 88 | 91 | 92 |
| Mech.prop.** (kg/cm$^2$) (psi) | 11 | 11 | 8 | 9 | 11 | 11 | 11 | 11 | 11 |
| Flow*** | 10 | 9 | 8 | 8 | 9 | 10 | 10 | 10 | 10 |
| Powder stability (28 days, 40° C.) | good | good | good | good | good | good | good | good | good |

*triglycidyl isocyanurate
**determined according to ASTM D 2794-69
***judged visually on a scale of 1–10, in which
1 = very bad
10 = excellent

We claim:

1. A powder coating wherein the binding agent is composed of a homogeneous mixture of a tri-epoxy compound and a polyester containing carboxyl groups, wherein said mixture contains between 1.4 and 5.3 wt. % of a tri-epoxy compound, and from 94.7 to 98.6 wt. % of a polyester of an aromatic dicarboxylic acid and an aliphatic diol having the following combination of properties: (a) an acid number between 10 and 26 mg KOH/g, (b) a hydroxyl number that is smaller than 15 mg KOH/g, (c) a theoretical number-average molecular weight between 4,500 and 12,500 and (d) a glass transition temperature between 40° and 85° C.

2. A polyester according to claim 1, wherein said acid number is between 12 and 24 mg KOH/g.

3. A polyester according to claim 1 wherein said hydroxyl number is 5 mg KOH/g at a maximum.

4. A polyester according to claim 1, wherein said theoretical number-average molecular weight is between 5,000 and 10,000.

5. A polyester according to claim 1, wherein said glass transition temperature of the polyester is between 50° and 70° C.

6. A polyester according to claim 1, wherein said average carboxyl functionality of the polyester is between 2 and 3.

7. A polyester according to claim 1, wherein said average carboxyl functionality of the polyester is between 2.2 and 2.8.

8. A polyester according to claim 1, wherein said dicarboxylic acid mixture consists of at least 50 wt. % of isophthalic acid and/or terephthalic acid.

9. A polyester according to claim 1, wherein said dicarboxylic acid mixture consists of at least 70 mol. % of isophthalic acid and/or terephthalic acid.

10. A polyester according to claim 1, wherein said aliphatic diol mixture consists of at least 50 mol. % of neopentyl glycol and propylene glycol.

11. A polyester according to claim 1, wherein said polyester contains a compound which has at least 4 methylene groups in an amount of up to 15 mol. %.

12. A powder coating according to claim 10, wherein the weight percentage of said tri-epoxy compound is between 1.6 and 4.9.

13. A powder coating according to claim 10 wherein said tri-epoxy compound is triglycidyl isocyanurate.

14. A polyester according to claim 1 wherein said acid number is between 12 and 24 mg KOH/g, said hydroxyl number is 5 mg KOH/g at a maximum, said theoretical number-average molecular weight is between 5,000 and 10,000, said glass transition temperature of the polyester is between 50° and 70° C. and said average carboxyl functionality of the polyester is between 2 and 3.

15. A polyester according to claim 14 wherein said dicarboxylic acid mixture consists of at least 50 wt. % of isophthalic acid and/or terephthalic acid.

16. A polyester according to claim 14 wherein said dicarboxylic acid mixture consists of at least 70 mol. % of isophthalic acid and/or terephthalic acid.

17. A polyester according to claim 14 wherein said aliphatic diol mixture consists of at least 50 mol. % of neopentyl glycol and propylene glycol.

* * * * *